Patented Apr. 21, 1942

2,280,202

UNITED STATES PATENT OFFICE 2,280,202

REFRIGERATING APPARATUS

Raymond E. Tobey, Springfield, Mass., assignor to Westinghouse Electric & Manufacturing Company, East Pittsburgh, Pa., a corporation of Pennsylvania Application February 21, 1940, Serial No. 320,043

10 Claims. (Cl. 62—4)

My invention relates to refrigeration apparatus and particularly to a control for refrigeration apparatus.

It is desirable to maintain a constant temperature in the chamber or zone to be refrigerated and several methods of maintaining constant temperature have been used. For example, various arrangements have been suggested using snap-acting switches operated by a volatile refrigerant. However, a less expensive arrangement for maintaining a substantially constant temperature is to render the refrigerating apparatus active and inactive by means of a sensitive low differential bi-metal type control located inside of the chamber to be refrigerated and actuated directly by changes in the temperature of the media in the chamber.

There are, however, certain disadvantages to a low differential bi-metal control. For example, since the temperature of the media in the zone, especially air, changes slowly and the change in the temperature of the bi-metal lags behind the air change, the refrigerating mechanism or circulating device may not be rendered inactive soon enough to prevent considerable change in the temperature of the media, because the cooling element for refrigerating the zone abstracts too much heat therefrom. Furthermore, when the access door of the chamber to be refrigerated is opened in a warm room, the bi-metal thermostat warms up quickly and starts the unit almost immediately after it has been stopped. In refrigerating apparatus utilizing a fixed restriction expansion device such as a capillary tube between the evaporator and condenser, it is necessary that the pressure across the restriction equalize somewhat before the refrigerant-circulating mechanism can start. This is primarily the case in compression type refrigeration apparatus which is driven by an electric motor and in which no unloader is utilized.

It is, therefore, an object of my invention to provide a control for refrigeration apparatus of the low differential bi-metal type which will maintain a substantially constant temperature in the chamber to be refrigerated.

It is another object of my invention to provide a constant temperature control which is inexpensive and which prevents over-shooting of the temperature of the media in the chamber.

It is also an object of my invention to provide a constant temperature control for a refrigerator of the low differential bi-metal type which will interpose a time delay between stopping and restarting of the refrigerant-circulating means.

These and other objects are effected by my invention as will be apparent from the following description and claims taken in connection with the accompanying drawing, forming a part of this application, in which:

Figure 1:
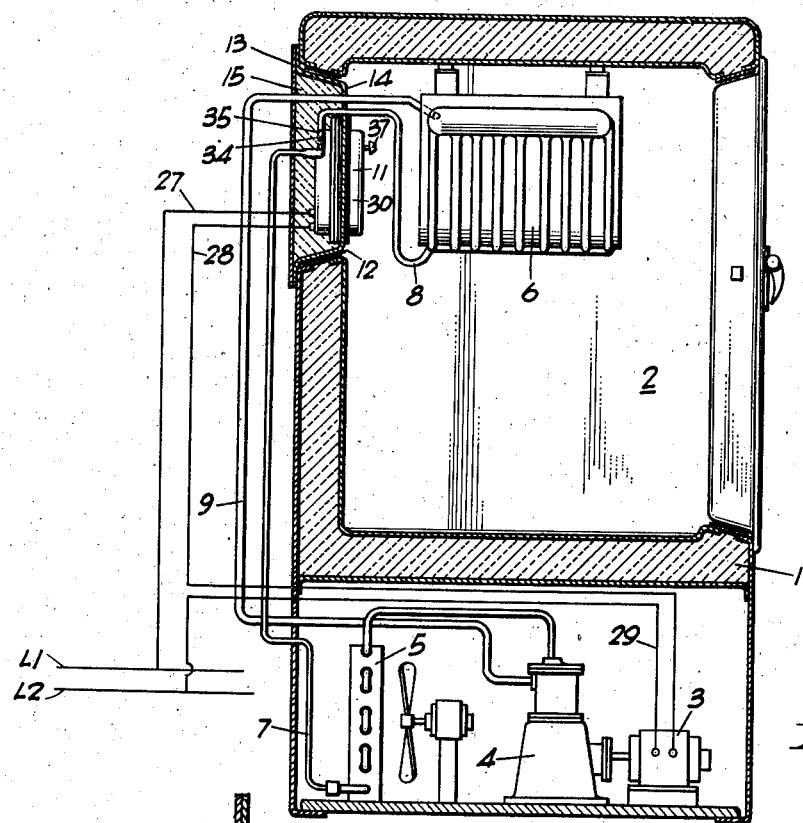
Fig. 1 is a diagrammatic view of refrigeration apparatus embodying my improved constant temperature control mechanism.

Referring specifically to the drawing for a detailed explanation of my invention, numeral 1 designates the insulated walls of a refrigerator cabinet which enclose a chamber or zone 2 which is to be refrigerated. A door is provided for obtaining access to the compartment 2.

A refrigerant-circulating mechanism is provided for refrigerating the chamber 2 and is shown diagrammatically in the drawing. The refrigerant-circulating mechanism is of the compression type, by way of example, and includes an electric motor 3 which drives a compressor 4. Refrigerant is compressed by the compressor 4 and is conveyed to a condenser 5, wherein it is cooled and liquefied. Liquefied refrigerant is conveyed from the condenser 5 to a cooling element or evaporator 6 through a capillary tube 7 and a liquid line 8. The liquid line 8 is larger in diameter than the capillary tube 7 and may be considered as a part of the evaporator 6, since refrigerant expands therein and it substantially assumes the temperature of the evaporator when the refrigerating mechanism is operating. Refrigerant which is vaporized in evaporator 6 and liquid line 8 is returned to the compressor through a suction conduit 9, whereupon the refrigerating cycle is repeated.

In order to control the operation of the motor 3 and compressor 4 and to maintain a substantially constant temperature in the chamber 2, a control device generally indicated at 11 is preferably inserted through an aperture 12 in the cabinet walls 1, which aperture is closed by an external plate 13 and an internal plate 14, heat insulation 15 being disposed between the plates. The internal plate 14 is provided with an aperture 16 therein through which the control 11 extends.

The control 11 comprises a longitudinal strip of insulating material 17 having a cross strip of insulating material 18 mounted thereon. A sensitive low differential bi-metal thermostat 19 is mounted on one side of the cross strip 18 and a second similar thermostat 21 is located on the other side of the insulating strip 18, both the thermostats 19 and 21 extending downwardly therefrom and preferably being of the creep-type as distinguished from the snap-acting type. Movable contacts 22 and 23 are provided at the ends of the bi-metal strips 19 and 21, respectively. Three contacts 24, 25 and 26 are disposed near the bottom of the insulating strip 17 in such a position that contacts 24 and 25 are bridged by movable contact 22 on the bi-metal strip 19 and contacts 25 and 26 are bridged by movable contact 23 on the bi-metal strip 21. The fixed contact 24 is connected to one side of a line $L_1$ through a conductor 27 and fixed contact 26 is connected to the other side of the line $L_2$ through a conductor 28, motor 3 and conductor 29.

The insulating strip 17 is of sufficient size to cover the aperture 16 in the plate 14 and is provided with a gasket 31 providing a seal between the chamber 2 and the heat insulation 15.

Figure 2:
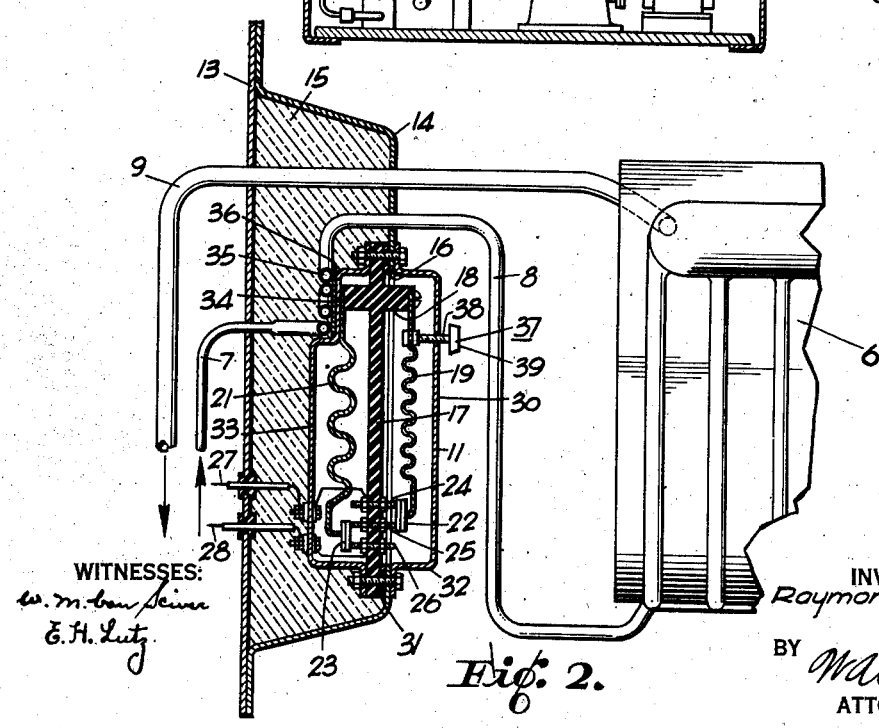
Fig. 2 is an enlarged view of my improved control mechanism.

As best shown in Fig. 2, a casing 30 is provided for the control 11 and includes an interior portion 32 formed of a material having a low thermal drop therethrough, which is attached by any suitable means to the interior plate 14. A second casing portion 33 also formed of a material having a low thermal drop therethrough is disposed in the heat insulation 15 and clamps the insulating strip 17 in position. The upper portion of the casing 33 is offset as shown at 34 so that it contacts the top of the bi-metal strip 21. It is obvious that the control device 11 thus far described may be assembled as a unit into the refrigerator cabinet without affecting any refrigerant connections.

A portion 35 of the liquid line 8, which contains vaporized refrigerant and which is, therefore, substantially at the temperature of the main portion of the evaporator 6, is placed in contact with the offset portion 34 of the casing 33. If desired, the conduit 35 may be soldered to a small plate 36 which may in turn be screwed to the offset casing portion 34, thus providing an easy way of assembling.

*Operation*

The movable contacts 22 and 23 are both shown in the drawing in the closed position. The motor 3 will, therefore, be operating and driving the compressor 4, the motor being energized from line $L_1$ to conductor 27, contacts 24, 22, 25, 23 and 26, through conductor 28, motor 3 and conductor 29 to line $L_2$. Refrigerant is, therefore, supplied to the evaporator 6 through the capillary tube 7 and liquid line 8, the liquid line 8 substantially assuming the temperature of the evaporator 6. Portion 35 of the liquid line 8 cools the plate 36 and casing portion 34 rather quickly and in turn cools the bi-metal strip 21, causing it to move out and break the connection between movable contact 23 and fixed contacts 25 and 26. The motor circuit is, therefore, broken and the refrigerating mechanism rendered inactive. As soon as the refrigerating mechanism is rendered inactive, refrigeration of the portion 35 of the liquid line 8 is stopped and since the conduit portion 35, plate 36 and casing 33 are all of small mass, they warm up fairly rapidly due to heat leakage through the external plate 13 and insulation 15. These parts will warm up more quickly when the temperature of the media surrounding the cabinet walls 1 is higher and will not warm up so quickly when the temperature of said media is lower.

After the bi-metal strip 21 has warmed up sufficiently, the contact 23 again bridges the contacts 25 and 26 and the circuit of the motor 3 is established which again renders the refrigerating mechanism active. However, the motor 3 is energized only if the temperature in the chamber 2 is still above the desired value so that the movable contact 22 is bridging the fixed contacts 24 and 25. If the temperature in the chamber 2 has fallen below the desired value, the bi-metal strip 19 will have moved the contact 22 away from the fixed contacts 24 and 25 and the motor 3 will not be energized until the temperature in the food compartment 2 rises sufficiently to warm the bi-metal strip 19 and close the contacts 22, 24 and 25.

By utilizing the control such as described above, the refrigerating mechanism is operated on shorter, more frequent cycles than if a bi-metal strip is utilized which is responsive only to the temperature of the media in the chamber 2, disregarding, for the moment, sudden rises in the temperature of the media due to door openings and the like. Such operation is effected because the bi-metal strip 21 is cooled quickly by the portion 35 of liquid line 8 when the refrigerating mechanism is operating, thus opening contact 22 rather quickly. Under normal conditions, the contact 23 will open and close several times before the temperature in the chamber 2 has reached a sufficiently low value to cause thermostat 19 to open contact 22. The temperature of the evaporator 6 has not been depressed to an extremely low value since it has heated up slightly each time the contact 23 has opened and the evaporator 6, therefore, does not contain the large amount of heat absorbing capacity which would reduce the temperature of the media in the chamber 2 below the desired value. However, the media in the chamber 2 need only rise in temperature a very small amount to close the sensitive low differential thermostat 19 and the temperature of the media, therefore, does not rise any appreciable amount above the desired value.

With compression type refrigeration such as illustrated in the drawing, wherein a fixed restriction expansion device, such as a capillary tube 7, is utilized between the condenser and the evaporator, it is customary to dispense with an unloader, since the pressure between the condenser and the evaporator will equalize sufficiently in a short time through the capillary tube to permit starting of the motor 3 under light load. However, if an attempt is made to start the motor 3 immediately upon the completion of an active cycle, the motor 3 will not start because of the relatively heavy load imposed thereon. When a low differential thermostat is used, it is very sensitive to heat changes in the chamber 2 and may close the contact 22 when the access door is open for a short time in a warm room. The contact 22 may also close when an appreciable heat load is placed in the chamber 2, such as a dish of warm food. The control 11, however, prevents immediate starting of the motor 3 because the contact 23 is opened by the cooling of the bi-metal strip 21 from the previous active cycle. It requires an appreciable period of time, depending on outside temperature, for the bi-metal strip 21 to warm up sufficiently to close contact 23 and if contact 23 is not closed, it is obvious that motor 3 will not start. The short time delay in the closing of the contact 23 is sufficient to permit the pressure between the condenser and the evaporator to equalize sufficiently that the motor 3 will start.

An adjusting device 37 may be provided, if desired, for adjusting the average temperature of the media in the chamber 2. The adjusting device 37 preferably comprises a shaft 38 threaded into the casing portion 32 and connecting with the bi-metal strip 19. An adjusting knob 39 may be provided on the adjusting device 37. As the shaft 38 is turned, it moves the bi-metal strip 19, together with its contact 22, toward or away from the fixed contacts 24 and 25. If the movable contact 22 is moved further away from the fixed contacts 24 and 25, the temperature of the media in the chamber 2 must rise to a higher value to cause the contact 22 to close the contacts 24 and 25 and vice versa.

From the foregoing, it will be apparent that I have provided a novel and inexpensive temperature control for a refrigerating mechanism which will maintain a substantially constant temperature in the chamber to be refrigerated and which utilizes sensitive low differential bi-metal strips which are preferably of creep-acting type as distinguished from the snap-acting type.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In refrigeration apparatus, the combination of a chamber to be refrigerated, cooling means at least a part of which abstracts heat from the chamber, means for circulating refrigerant through said cooling means, and a plurality of temperature-responsive means each having switch means associated therewith for rendering said circulating means active when the temperature-responsive means closes all the switch means and inactive when said temperature-responsive means opens one or more of said switch means, one of said temperature-responsive means being influenced primarily by the temperature of the media in said chamber and another being conjointly influenced by the temperature of the media surrounding said chamber and the temperature of a portion of said cooling means, so that the temperature of the media in said chamber is maintained within relatively narrow limits.

2. In refrigeration apparatus, the combination of a chamber to be refrigerated, cooling means at least a part of which abstracts heat from the chamber, means for circulating refrigerant through said cooling means, a plurality of temperature-responsive means each having switch means associated therewith for rendering said circulating means active when the temperature-responsive means closes all the switch means and inactive when said temperature-responsive means opens one or more of said switch means, one of said temperature-responsive means being influenced primarily by the temperature of the media in said chamber and another being conjointly influenced by the temperature of the media surrounding said chamber and the temperature of a portion of said cooling means, so that the temperature of the media in said chamber is maintained within relatively narrow limits and means for varying the mean temperature of the media in the chamber.

3. In refrigeration apparatus, the combination of a chamber to be refrigerated, cooling means at least a part of which abstracts heat from the chamber, means for circulating refrigerant through said cooling means, and a plurality of temperature-responsive means each having switch means associated therewith for rendering said circulating means active when the temperature-responsive means closes all the switch means and inactive when said temperature-responsive means opens one or more of said switch means, one of said temperature-responsive means being influenced primarily by the temperature of the media in said chamber and another being conjointly influenced by the temperature of the media surrounding said chamber and the temperature of a portion of said cooling means, so that the temperature of the media in said chamber is maintained within relatively narrow limits, said latter temperature-responsive means being arranged to interpose a time delay between stopping and restarting of the circulating means to prevent immediate restarting thereof in response to a heavy heat load in said chamber.

4. The combination claimed in claim 3 wherein the circulating means includes a condenser and an evaporator with a fixed flow restriction device therebetween and the time delay affords at least partial equalization of pressure between the condenser and evaporator when the circulating means is stopped.

5. In refrigeration apparatus, the combination of a chamber containing a media to be refrigerated, cooling means for abstracting heat from the media in said chamber, means for circulating refrigerant through said cooling means, a creep-type thermostat for rendering said circulating means active and inactive to maintain said media at a predetermined mean temperature, and means for interposing a relatively short time delay between every active cycle of said circulating means.

6. In refrigeration apparatus, the combination of a chamber containing a media to be refrigerated, cooling means for abstracting heat from the media in said chamber, means for circulating refrigerant through said cooling means including a condenser and a constantly open flow restricting device between the condenser and cooling means, a creep-type thermostat for rendering said circulating means active and inactive to maintain said media at a predetermined mean temperature, and means for interposing a relatively short time delay between every active cycle of said circulating means to afford at least partial equalization of pressures between said condenser and cooling means.

7. In refrigeration apparatus, the combination of a chamber containing a media to be refrigerated, cooling means for abstracting heat from the media in said chamber, means for circulating refrigerant through said cooling means, a first thermostat for rendering said circulating means active and inactive to maintain said media at a predetermined mean temperature and a second thermostat for interposing a short time delay between every active cycle of said circulating means.

8. In refrigeration apparatus, the combination of a chamber containing a media to be refrigerated, cooling means at least part of which abstracts heat from the media in said chamber, means for circulating refrigerant through said cooling means, a thermostat for rendering said circulating means active and inactive to maintain said media at a predetermined mean temperature and control means conjointly responsive to a condition of the cooling means and the temperature ambient the apparatus for rendering the circulating means inactive at intervals and interposing a time delay before conditioning the apparatus for an active cycle, said control means operating independently of said thermostat.

9. In refrigeration apparatus, the combination of a chamber containing a media to be refrigerated, cooling means at least part of which abstracts heat from the media in said chamber, means for circulating refrigerant through said cooling means, a low differential bi-metal thermostat for rendering said circulating means active and inactive to maintain said media at a predetermined mean temperature and a second bi-metal thermostat for rendering the circulating means inactive at intervals and interposing a time delay before conditioning said apparatus for an active cycle, said second thermostat being conjointly responsive to a temperature condition of the cooling means and the temperature ambient the apparatus and also operating independently of said low differential thermostat.

10. In refrigeration apparatus, the combination of a chamber containing a media to be refrigerated, cooling means at least part of which abstracts heat from the media in said chamber, means for circulating refrigerant through said cooling means, a bi-metal thermostat for rendering said circulating means active and inactive to maintain said media at a predetermined mean temperature and a second bi-metal thermostat for rendering the circulating means inactive at intervals and interposing a time delay before conditioning said apparatus for an active cycle, said second thermostat being conjointly responsive to a temperature condition of the cooling means and the temperature ambient the apparatus and also operating independently of said first thermostat.

RAYMOND E. TOBEY.